Sept. 4, 1945. A. J. SCHUBERT ET AL 2,384,402
FLANGED METAL ARTICLE AND METHOD OF MAKING SAME
Filed June 13, 1942
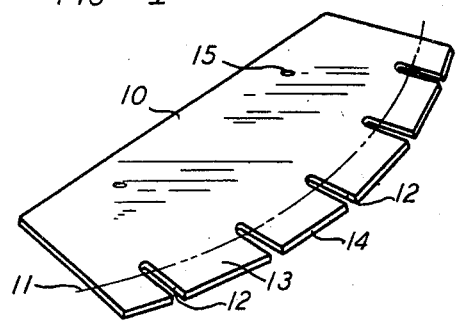
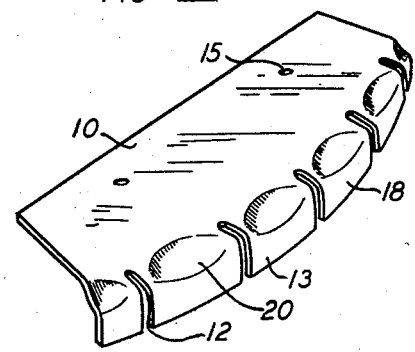
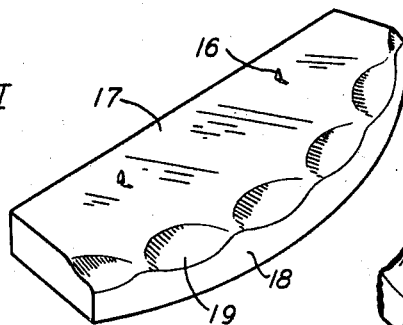
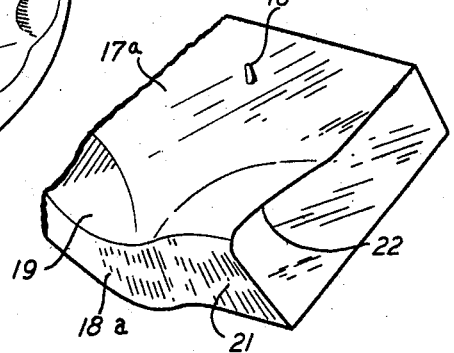
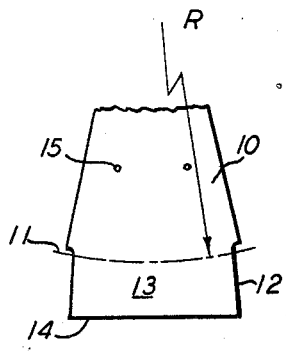
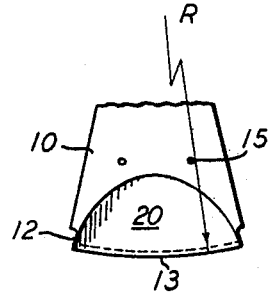
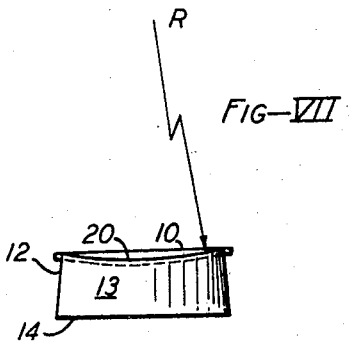
INVENTORS
ANDREW J. SCHUBERT
HARRY S. ADELHANOF
BY George C. Sullivan

UNITED STATES PATENT OFFICE 2,384,402

FLANGED METAL ARTICLE AND METHOD OF MAKING SAME

Andrew J. Schubert, Burbank, and Harry S. Adelhanof, Sherman Oaks, Calif., assignors to Lockheed Aircraft Corporation, Burbank, Calif.

Application June 13, 1942, Serial No. 446,914

5 Claims. (Cl. 189—34)

This invention relates to a sheet metal convex flanged article, and to a method of forming the same in a rubber platen press, such flanges normally involving shrinkage or compression of the material in the flanges, with an attendant buckling or wrinkling therein due to the plastic flow characteristics of the rubber pad used as a female die in pressing the sheet metal over form blocks, especially when thin sheets of the harder grades of aluminum alloys, or stainless steel, are to be so formed.

In the forming of sheet metal under thick rubber blocks in a hydro-press, as disclosed in the Guerin Patent No. 2,055,077 for example, it has heretofore been extremely difficult to form convexly curved flanges or joggles in sheet metal, the difficulty being accentuated in the thinner gages and harder tempers, which resist the compression or shrinkage required to form a flange over a convex bending line. It has heretofore been proposed to use external aids such as bearer blocks, traps for guiding the flow of rubber over the flange, or spring loaded draw rings. The present invention entirely eliminates the need of such aids, as well as hand work in correcting wrinkled flanges, and results in a true and smoothly curved flange, the metal of which has not been disturbed or worked other than being bent to the radius of the flange as well as in the bend joining the flange to the blank.

It is accordingly an object of this invention to provide an improved method of forming convex or shrink flanges and joggles, whereby gathering, shrinking or compressing the material in the flange is eliminated.

Other and further important objects of this invention will be apparent from the disclosures in the specification and the accompanying drawing.

In its broader aspects this invention applies to more complex curves than simple circular arcs, but for simplicity in explaining the invention, an arcuate form has been chosen for illustrating the application of the method of this invention.

In the accompanying drawing—

Figure I is a perspective view of a prepared sheet metal blank which is to be formed by the method of this invention.

Figure II is a similar view of a form block over which the blank of Figure I is to be formed.

Figure III is a similar view of the blank of Figure I after forming over the block.

Figure IV is a perspective fragmentary view of a forming block for a part with a convex flange having a joggle or offset therein.

Figures V, VI and VII successively show an element of the blank in plan view, the resulting flanged blank, and a front view of the flange.

In describing the method of this invention it has been applied to aircraft practice wherein curved bulkhead rings or wing ribs require convexly curved flanges standing at substantial right angles to the plane of the sheet metal blank. Such sheet metal parts are commonly formed in a hydro-press wherein a thick rubber blanket is forced down over forming blocks, on which the sheet metal blank is placed. In conventional practice, convexly curved flanges wrinkle badly during the forming process, which wrinkles must be bumped out by hand hammering.

The method of this invention may be practiced by dishing the web or plane of the part adjacent the flange, in order to eliminate compressive strains in the flange. For an arcuate flange at right angles to the plane of the web it is preferable to notch the flange at least to the inside of the bend line and to either dish or build up the form block between the notches to a radius approximately equal to the flange radius, thus eliminating compressive strains in the flange. For lesser or greater angles than right angle flanges the amount of dishing is decreased or increased respectively; in effect varying the camber of the dished area by varying the radius thereof.

In the example chosen, a sheet metal blank 10 is laid out, with the desired bend line 11 indicated thereon in the figure for reference purposes, and is notched as at 12 at intervals, the notches extending through the flange area as a minimum. The areas 13 of the blank 10 outside the bend line eventually form the finished flanges, and since they are not distorted in the forming operation, the outer edges 14 are cut in straight lines between the notches. The notch spacing is not critical, but is in practice determined by the desired spacing of longitudinals commonly mounted in such bulkhead rings and wing ribs. Since the web of the material is to be dished between the notches this imposes a limitation on the notch spacing since the dishing encroaches on the flange width available for rivets or other fastenings. In some cases it will be desirable to bow the web upwardly to increase the flange area, as shown in connection with the joggle in Figure IV, instead of dishing the web downwardly as described hereinafter.

The sheet metal blank 10 is provided with locating holes 15 to engage pins 16 in a forming block 17. The block conforms to the desired shape of the finished part, so that the convex edge 18 corresponds in plan view to the bend line 11 in Figure I. The flat top surface of the block is carried out to the bend line at the notch locations and is dished as at 19 therebetween, the dish effect being conveniently cut as a cylindrical surface inclined relative to the surface of the block to blend thereinto a short distance back from the bend line. The blending of the dished area into the surface of the block is preferably softened to avoid an abrupt edge. The angle of the axis of the dished area may be varied between wide limits, being chosen to suit the part being worked on, the flatter the dish angle the less working or metal flow required in the web of the part or blank. In theory, if the dished area were carried in to the axis of the curved bend line, no working of the web metal would be required, but such an arrangement would be unduly complicated in practice. The dished areas 19 in the form block 17 are reproduced at 20 in the finished part as indicated in Figure III.

Figures V, VI and VII are offered to explain the action of the method of this invention in forming the convex flanges 13 without distortion or gathering of the metal therein. Figure V represents one element of the blank 10 between the two notches, and Figure VI is the corresponding finished part; Figure VII being an edge view thereof. The radius R of the bend line 11 is the same in each figure. Comparing the web of the blank inside the bend line in Figure V with the corresponding area of Figure VI it will be seen that only a slight working or stretching of the web material into the dished area 20 is involved, the outline remaining the same. Similarly comparing the flange area 13 of Figure V with the finished flange of Figure VII shows that the flange is curved to shape without distortion or working.

Figure IV illustrates the application of a joggle or offset 21 in the edge 18ᵃ of the form block, such joggles being necessary to seat the flanges of longitudinals in conventional aircraft construction. This figure combines the heretofore described dished surface 19 in the form block 17ᵃ with a bowed or built up area 22 on the block to form an offset flange at 21. Either a dished or bulged area in the forming block would be effective, the latter providing more flange area for riveting or other fastening means.

The dished form block will function satisfactorily in forming convexly bent flanges or joggles, and the resulting displacements of the web metal add to the stiffness thereof at no additional cost in weight. Moreover, in each case the forming of the displaced areas involves simple stretching of the sheet metal blank, which operation is performed at the same time as the flange is bent over the bend line of the forming block.

It will thus be seen that our improved method of forming convexly curved flanges or joggles eliminates compressive working of the material in the flanges and therefore permits such forming operations on stainless steel and other hard metals such as heat treated aluminum alloys which have heretofore been difficult to work in a rubber forming press.

Having thus described our invention and the present preferred embodiments thereof, we desire to emphasize the fact that many modifications may be resorted to in a manner limited only by a just interpretation of the following claims.

We claim as our invention:

1. A convexly flanged sheet metal article comprising a substantially flat sheet metal body formed to provide an integral convexly curved flange at approximate right angles to the plane of the flat sheet along at least one side thereof, the sheet metal of said body portion being formed to provide a series of dished areas along the edge formed with said convexly curved flange, said dished areas merging into the flat sheet metal of the body as they recede from the convex flange, said dished areas being slightly spaced from each other and said convexly curved flange having notches between each of said dished areas.

2. A convexly flanged sheet metal article comprising a substantially flat sheet metal body having an integral flange along at least one margin thereof, said flange being convexly curved in the plane of the sheet metal body to define a convex edge therefor, the sheet metal of said body portion being formed to provide a series of dished areas along the edge formed with said convexly curved flange, said dished areas merging into the flat sheet metal of the body as they recede from the convex flange, said dished areas being slightly spaced from each other and said convexly curved flange having notches between each of said dished areas.

3. The method of ending and forming a convex flange on a sheet metal blank which comprises notching the convex flange area of the blank at intervals, placing the notched blank on a form block having a face and a flange-forming edge, extending the notched flange area of the blank beyond the flange bending line of the form block, applying a rubber press element to the blank and thereby holding the major portion of the blank against the face of the form block and pressing limited areas of the blank extending inwardly from and merging with the flange line out of the plane of the blank and thereby forming depressions in the blank aligned with the flange sections and including the flange bending line between the notches, while pressing the flange area of the blank around the flange bending line of the form block and against the edge thereof, thereby bending and forming the flange.

4. The method of bending and forming a convex flange on a sheet metal blank which comprises notching the convex flange area of the blank at intervals, placing the notched blank on a form block having a face and a flange-forming edge, extending the notched flange area of the blank beyond the flange bending line of the form block, applying a rubber press element to the blank and thereby holding the major portion of the blank against the face of the form block and pressing limited areas of the blank extending inwardly from the flange line out of the plane of the blank and thereby dishing small areas of the blank in merging relationship with the flange bending line, said areas being centered relative to the flange areas between notches while simultaneously pressing the flange area of the blank around the flange bending line of the form block and against the edge thereof, thereby bending and forming the convex flange and disposing the excess metal of the flange in the dished areas of the blank.

5. A convexly flanged sheet metal article having an appreciable flat plate area adjacent and approximately normal to the convex flange, said convex flange having notches at intervals along its length and the flat plate area of the article having radially fluted areas merging into the flange between the notches thereof, the radially fluted areas being deepest at the flange and tapering out at an angle to the plane of the flat plate area of the article whereby to merge into said area.

ANDREW J. SCHUBERT.
HARRY S. ADELHANOF.